Figure 4:
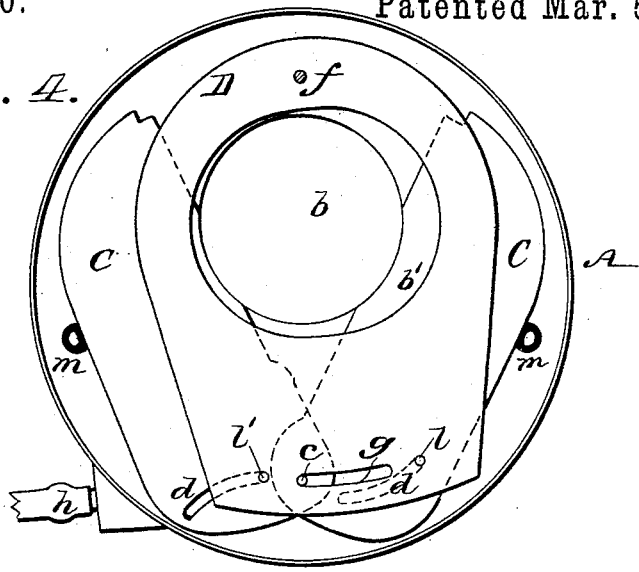

(No Model.) 2 Sheets—Sheet 1.
W. SHAKESPEARE, Jr. & G. W. LOW.
CAMERA SHUTTER.
No. 398,980. Patented Mar. 5, 1889.
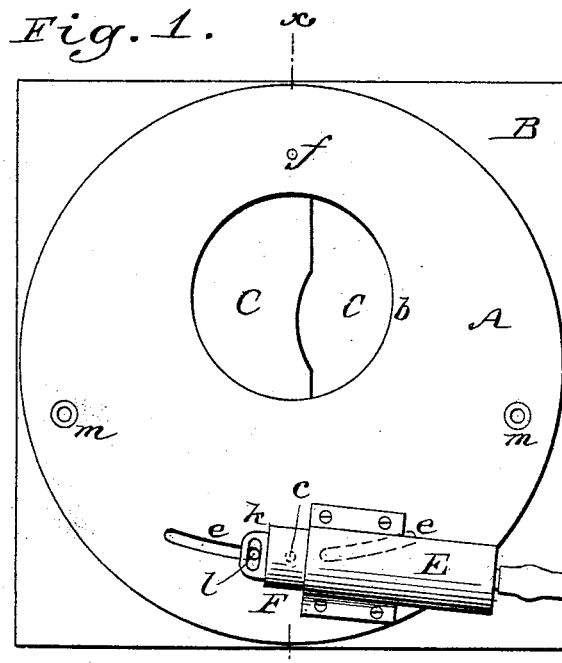
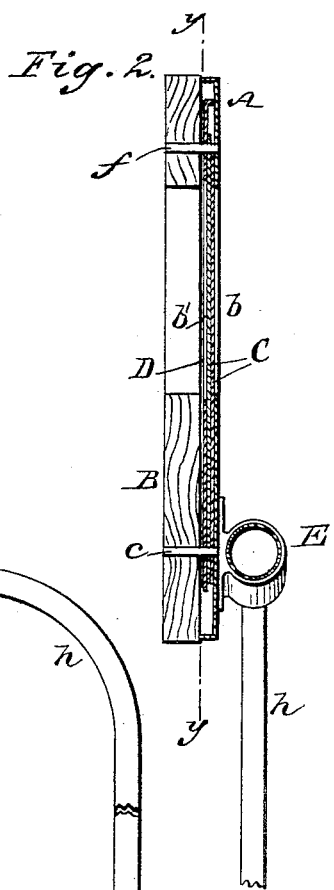
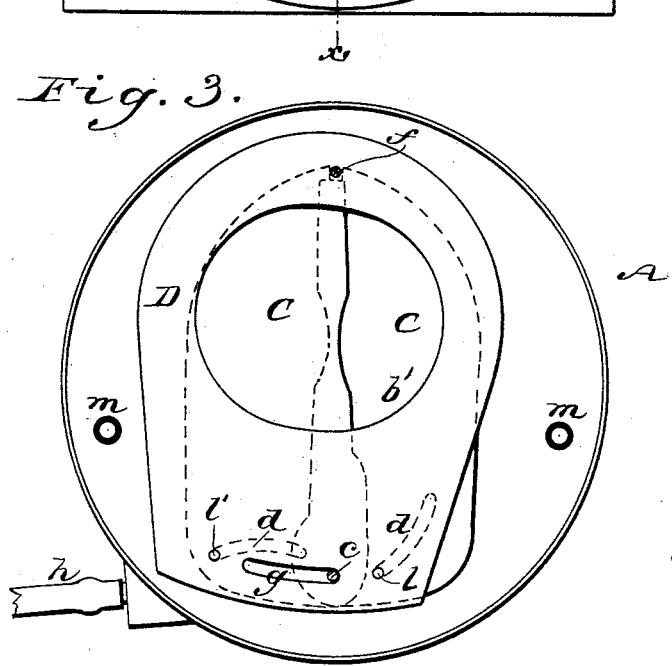
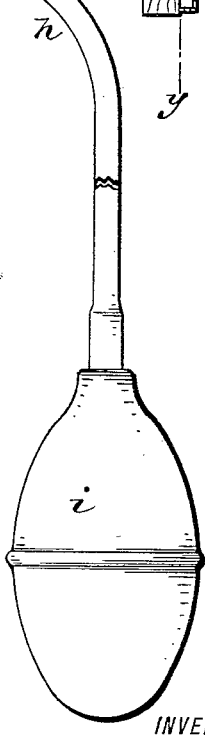
WITNESSES:
John H. Deemer
C. Sedgwick
INVENTOR:
W. Shakespeare Jr.
G. W. Low
Munn & Co.
ATTORNEYS.
N. PETERS, Photo-Lithographer, Washington, D. C.

(No Model.) 2 Sheets—Sheet 2.

W. SHAKESPEARE, Jr. & G. W. LOW.
CAMERA SHUTTER.

No. 398,980. Patented Mar. 5, 1889.

WITNESSES:

INVENTOR:
W. Shakespeare Jr.
BY G. W. Low
Munn & Co.
ATTORNEYS.

UNITED STATES PATENT OFFICE.

WILLIAM SHAKESPEARE, JR., AND GARRETT W. LOW, OF KALAMAZOO, MICHIGAN.

CAMERA-SHUTTER.

SPECIFICATION forming part of Letters Patent No. 398,980, dated March 5, 1889.

Application filed July 3, 1888. Serial No. 278,925. (No model.)

*To all whom it may concern:*

Be it known that we, WILLIAM SHAKESPEARE, Jr., and GARRETT W. LOW, both of Kalamazoo, in the county of Kalamazoo and State of Michigan, have invented a new and useful Improvement in Camera-Shutters, of which the following is a full, clear, and exact description.

Our invention more particularly relates to camera-shutters in which a pair of swinging slides or wings arranged to approach and overlap or to recede from each other are used to cover or expose the opening in the camera which faces the lens through which light is admitted when making an exposure; and the invention consists in certain novel constructions and combinations of parts, including special means for operating said slides; also a special construction of parts for taking stereoscopic pictures, the invention, however, being also applicable to cameras having but a single exposing-aperture.

The improved shutter, while being particularly adapted for use in taking instantaneous photographs, may also be used for taking time pictures, and, as in the case of camera-shutters of different kinds, including curvilinearly-moving double slides, it is preferred to actuate the shutter from any convenient distance by an air-cylinder and piston controlled by a flexible hand-bulb, or otherwise.

Reference is to be had to the accompanying drawings, forming a part of this specification, in which similar letters of reference indicate corresponding parts in all the figures.

Figure 1 represents a front elevation of the shutter-case of a camera having but a single exposing-aperture, also showing a similarly-apertured board, which may represent the front end of the camera at back of said case, likewise showing the shutter-slides when closed and the air device for actuating the shutter. Fig. 2 is a section of the same, mainly upon the line $xx$ in Fig. 1. Fig. 3 is a sectional view mainly upon the line $yy$ in Fig. 1, looking toward the front, and Fig. 4 a similar section or rear view showing the shutter-slides as thrown open. Fig. 5 is a view similar to Fig. 4, but showing the shutter as adapted to a camera having two exposing-apertures for taking stereoscopic pictures.

Referring in the first instance, or more particularly, to the first four figures of the drawing, A is the shutter-case, which may be made of metal and which has an exposing-aperture, $b$, in it in line with a similar aperture, also marked $b$, in the board B, on which the case A is secured by screws or otherwise, and so that the case forms a light-tight junction at its edges with said board. The exposing aperture or apertures $b$ are of course in line with or opposite the camera-lens.

Figure 5:
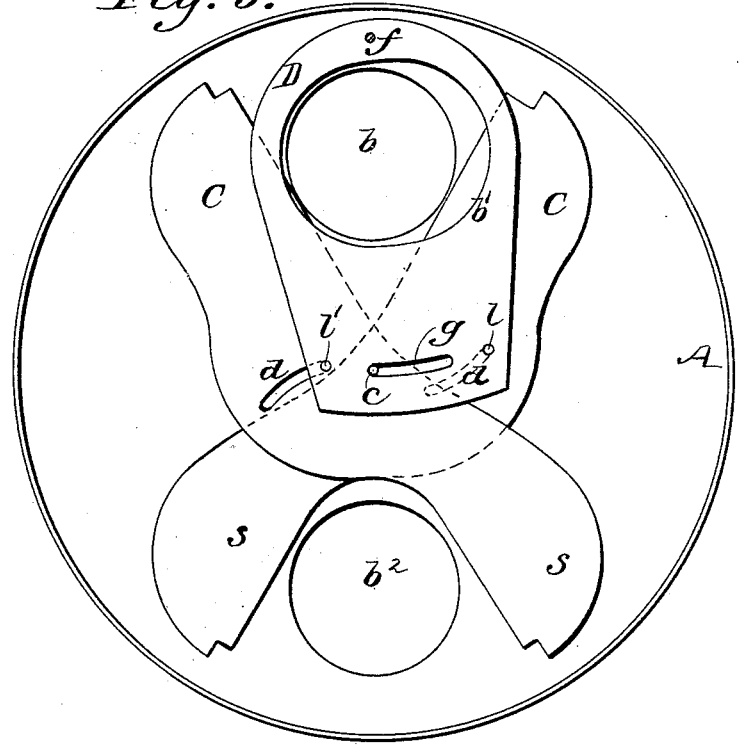

C C are the pivoted or swinging slides, which combined form the shutter proper, and which may be made of any suitable material and of any suitable shape to close the exposing-aperture when made to swing or advance toward each other and overlap one another at their meeting edges as shown in Figs. 1, 2, and 3, or which when made to recede sufficiently far from each other open the exposing-aperture, as shown in Fig. 4. These curvilinearly-moving slides or sectional shutters C C work close up to the back of the case A and are fitted to swing or rock upon a pivot or pin, $c$, (here shown as arranged below and serving as the working pivot for both slides, C C,) said pivot or pin $c$ being carried by the shutter case or frame.

Near the pivot ends of the slides C C, on opposite sides of the pivot $c$, two curved slots, $d\,d$, are made in said slides—that is, one slot $d$ in each. These slots are of reverse and different curvatures, and are struck from independent centers far removed from the pivotal center $c$ of the slides C C, and virtually form reverse inclines. The case A is also constructed with curved slots $e\,e$ in it near the pivotal ends of the slides C C. The purpose of these several slots will be hereinafter explained.

Pivoted to the back of the case A, or inside of the shutter-frame, as by a pin, $f$, arranged above the exposing-aperture $b$ or on the opposite side of it to that occupied by the shutter-pivot $c$, is a pendent or swinging shutter-operating plate, arm, or lever, D, having an enlarged exposing-aperture, $b'$, in it and arranged to lie on or against the backs of the shutter-slides C C. Said plate D is steadied or guided in its vibrating movement, and has its extent of motion limited by the extension of the pivot-pin $c$ through a curved slot, $g$, in said plate.

E is the cylinder of the air-engine or shutter-actuating device, with its attached flexible tube $h$ and hand-bulb $i$, and F is the piston arranged to move in or out of said cylinder accordingly as the flexible bulb $i$ is compressed or relaxed by the action of the hand. The cylinder E is fast on the outside of the case A, and the piston F has a slotted projection, $k$, on its outer end, which serves to receive in engagement with it a stud or pin, $l$, arranged to project from the side of the swinging plate, arm, or lever D, and of sufficient length to pass through the slot $d$ of the one swinging slide C through the one slot $e$ in the case, and from thence to engage with the slotted projection $k$ of the piston F. The swinging plate D is also provided on its face with another stud, $l'$, arranged to pass through the slot $d$ of the other swinging slide C and to enter or take its bearing in the other slot $e$ in the case, but need not extend beyond that, and consequently may be made shorter that the pin or stud $l$, which connects with the piston F. The slots $e$ $e$ in the case A are struck from the pivot-pin $f$ as a center, and their walls serve to form bearings for the pins $l$ $l'$; but the one of said slots which receives the shorter pin or stud, $l'$, might be omitted and only the other one retained for the pin $l$, which engages with the piston F to pass through.

In the operation of the shutter as thus constructed, and when the several parts are put together as represented and described, upon compressing the hand-bulb $i$ and forcing outward the piston F, the pin $l$, attached to the plate, arm, or lever D, and in engagement with said piston will be moved to one side, and will swing or move the plate D along with it, and as the pins $l$ and $l'$ both engage with the specially and reversely curved or inclined slots $d$ $d$ in the shutter-slides C C, both of said slides will be moved outward or away from each other to uncover the exposing-aperture $b$. Upon releasing pressure from the hand-bulb, however, then a reverse action will take place, and the shutter-slides C C working toward each other will meet or overlap one another, and so close the exposing-aperture $b$. In this movement the operating-plate D has an action similar to that of a pendulum or lever, to aid in the working of the shutter-slides, and it might be called a "lever-shutter-operating plate," and in some cases, if desired, this lever-plate might be used in connection with a shutter which is not divided into two separate slides, but is all in one and moves wholly across the exposing-aperture, in which case said lever-plate would only be provided with a single pin to operate the shutter, and only one set of slots in the shutter and case for said pin to work through would be necessary. The sectionally-constructed shutter, however, in which each section or swinging slide has but half the distance to move, is preferred.

While more particularly adapted to instantaneous photographing, the shutter may be otherwise and more slowly operated for taking time pictures.

The two shutter-slides C C are notched at their upper ends to engage with the pin $f$ when said slides are closed, and when said slides are thrown back or open jar may be avoided by causing them to strike against rubber or yielding stops $m$ $m$.

Fig. 5 of the drawings shows substantially the same construction, but as applied to a shutter-frame of a camera having two exposing-apertures out of line with each other for operation in connection with duplicate lenses, to be used in taking stereoscoping-pictures. In such case the swinging shutter-sections C C are made with additional wings or extensions, $s$ $s$, arranged to control the second or lower exposing-aperture, $b^2$, in the shutter frame or case.

Having thus described our invention, what we claim as new, and desire to secure by Letters Patent, is—

1. In a camera-shutter, the combination, with a swinging or rocking slotted shutter, of a pivoted arm, lever, or plate provided with a pin arranged to engage with the slot in the shutter for operating the latter, substantially as specified.

2. The combination, with the apertured shutter case or frame and its pivoted shutter-slides C C, having reverse slots $d$ $d$, of the pivoted lever-like operating-plate D, having studs or pins $l$ $l'$, arranged to engage with said slots, essentially as and for the purpose herein set forth.

3. The combination, with the apertured shutter case or frame having slots $e$, of the swinging or rocking shutter-slides C C, having a common pivot, $c$, and reverse slots $d$ $d$, and the pivoted arm, lever, or operating-plate D, having a slot, $g$, and pins $l$ $l'$, substantially as specified.

4. The combination of the piston F of the air-cylinder E with the pivoted lever-like shutter-operating plate D, having attached pins $l$ $l'$, and the pivoted swinging or rocking shutter-slides C C, having reverse slots $d$ $d$, essentially as described.

5. The combination, with a shutter case or frame having duplicate exposing-apertures $b$ $b^2$ out of line with each other, of a pivoted swinging or rocking slotted shutter or shutter-slides having extension-wings $s$, and the pivoted arm, lever, or shutter-operating plate with attached pin or pins for operating the shutter, substantially as specified.

WILLIAM SHAKESPEARE, JR.
GARRETT W. LOW.

Witnesses:
ANDREW J. SHAKESPEARE,
WILLIAM SHAKESPEARE.